United States Patent
Huang et al.

(10) Patent No.: US 11,368,114 B2
(45) Date of Patent: Jun. 21, 2022

(54) ADAPTIVE INERTIA CONTROL METHOD OF IIDG BASED ON VSG

(71) Applicant: SHANGHAI JIAOTONG UNIVERSITY, Shanghai (CN)

(72) Inventors: Wentao Huang, Shanghai (CN); Meiyi Li, Shanghai (CN); Nengling Tai, Shanghai (CN); Xiaodong Zheng, Shanghai (CN)

(73) Assignee: SHANGHAI JIAOTONG UNIVERSITY, Shanghai (CN)

( * ) Notice: Subject to any disclaimer, the term of this patent is extended or adjusted under 35 U.S.C. 154(b) by 338 days.

(21) Appl. No.: 16/630,407

(22) PCT Filed: Jul. 1, 2019

(86) PCT No.: PCT/CN2019/094150
§ 371 (c)(1),
(2) Date: Jan. 10, 2020

(87) PCT Pub. No.: WO2020/007255
PCT Pub. Date: Jan. 9, 2020

(65) Prior Publication Data
US 2020/0144946 A1 May 7, 2020

(30) Foreign Application Priority Data
Jul. 3, 2018 (CN) .......................... 201810711691.4

(51) Int. Cl.
*H02P 9/10* (2006.01)
*G05B 13/04* (2006.01)
(Continued)

(52) U.S. Cl.
CPC ............ *H02P 9/105* (2013.01); *G05B 13/041* (2013.01); *H02P 9/42* (2013.01); *H02P 2103/20* (2015.01)

(58) Field of Classification Search
CPC ........ H02P 9/105; H02P 9/42; H02P 2103/20; H02P 9/00; H02P 9/006; H02P 9/007; H02P 9/08; H02P 9/10; H02P 9/26; H02P 9/44; H02P 9/48; H02P 11/06; H02P 21/0017; H02P 23/00; H02P 23/0022; H02P 23/0027; H02P 25/00; H02P 25/064; H02P 27/00;
(Continued)

(56) References Cited

U.S. PATENT DOCUMENTS 11,239,779 B2 * 2/2022 Tuckey ..................... H02P 9/02

* cited by examiner

*Primary Examiner* — Antony M Paul
(74) *Attorney, Agent, or Firm* — CBM Patent Consulting, LLC

(57) ABSTRACT

The invention provides an adaptive inertial control method based on IIDG (Inverter Interfaced Distributed Generator) of a virtual synchronous motor. By building an adaptive virtual inertia and IIDG output frequency model, the adaptive control sensitive factor is selected from a model according to the virtual synchronous motor dynamic response features; the adaptive inertial upper and lower limits are selected from a model according to the energy storage configuration constraint; the IIDG optimization control strategy is obtained. The control on the grid-connected inverter distributive power supply can be realized, so that the IIDG output is more stable; the interference on the system can be well handled; meanwhile, the characteristics of small overshoot and fast response are realized; the ultra-high dynamic features are realized.

6 Claims, 6 Drawing Sheets

EML= Energy Management Layer
VSG-AICU = VSG active-frequency (P-f) adaptive inertia control unit

(51) Int. Cl.
*H02P 9/42* (2006.01)
*H02P 103/20* (2016.01)

(58) Field of Classification Search
CPC .......... H02P 27/04; H02P 27/06; H02P 27/08;
H02P 27/085; H02P 27/18; H02P 1/00;
H02P 1/66; H02P 1/24; H02P 1/46; H02P
1/52; H02P 6/00; H02P 6/005; H02P
6/34; H02P 7/29; G05B 13/041
See application file for complete search history.

EML= Energy Management Layer
VSG-AICU = VSG active-frequency (P-f) adaptive inertia control unit

ADAPTIVE INERTIA CONTROL METHOD OF IIDG BASED ON VSG

TECHNICAL FIELD

This invention relates to a technology in the field of intelligent control of power distribution network, and in particular it is an adaptive inertia control method of inverter interfaced distributed generator (IIDG) based on virtual synchronous generator (VSG).

BACKGROUND OF THE INVENTION

The increasing penetration of distributed generation (DG) brings direct impacts on the stability of the distribution network due to the lack of inertia. Conventional synchronous generators (SGs) with inherent rotating inertia are able to inject the stored kinetic energy under disturbances to ensure operation robustness against instability. Inspired by this concept, the virtual synchronous generator (VSG) control scheme was proposed for inverter-interfaced distribution generators (IIDG). By incorporating the swing equation, the VSG responds like the SG and will inject balancing energy within proper time scales during disturbances due to the virtual inertia. The VSG-IIDGs can help the voltage and frequency regulation of the connected distribution network. With the combined advantages of SGs and power electronics, the VSG is playing an important role in the large-scale integration of IIDGs.

With the wide application of VSG technology, the negative effect of IIDG's adopting fixed inertia control under different operating conditions has been shown. If the VSG adopts low inertia, the transient response speed is high, but the frequency fluctuation is large, which is not conducive to the stable operation of the system. If VSG adopts high inertia, the response of the control system is slow and the recovery time is long. The IIDG output power fluctuates greatly with large virtual inertia, and the stability margin is correspondingly reduced. In addition, many existing VSG control strategies do not consider the influence of frequency fluctuation and external system on IIDG disturbance.

SUMMARY OF INVENTION

The invention provides an adaptive inertia control method of IIDG based on virtual synchronous generator (VSG) to achieve flexible inertia control of the IIDG; in addition, the upper and lower ranges of the virtual inertia of the VSG are given according to the capacitance or battery energy storage configuration of the IIDG; and based on VSG's three-layer control, an adaptive inertial control system for IIDG is established. On the one hand, it can improve the stability of the system when the system is subjected to external disturbances. On the other hand, it considers the dynamic characteristics of small overshoot and fast response, and has stronger regulation capability of dynamic responses. The invention can provide an effective strategy for the grid-connected control of high permeability IIDG of power distribution networks.

The invention is realized through the following technical scheme:

The invention relates to an adaptive inertia control method of IIDG based on VSG. A model of adaptive virtual inertia and IIDG output frequency is built, and the sensitivity factor is selected from the model according to the dynamic response characteristics of the VSG. Then, the upper and lower limits of the adaptive inertia are selected from the model according to the energy storage configuration constraints to obtain the optimal control strategy of IIDG;

The said model of adaptive virtual inertia and IIDG output frequency is specifically described as follows:

$$H = \frac{H_h k_a^2 (\omega - \omega_{ref})^2 + H_0}{k_a^2 (\omega - \omega_{ref})^2 + 1},$$

wherein, $k_a$ is the adaptive control sensitivity factor, $H_0$ is IIDG's rated virtual inertia, that is, when $\omega = \omega_{ref}$, the virtual inertia H value is $H = H_0$ when $|\omega - \omega_{ref}| \to \infty$, the virtual inertia H is $H = H_h$. Because the larger the frequency deviation is, the larger the virtual inertia used to restore stability will be, $H_h$ is larger than $H_0$ in this invention. $H_h$ is also the upper limit of the variation range of the virtual inertia.

The selected adaptive control sensitivity factor above mentioned means: when a larger $k_a$ is adopted, it can increase response speed, ensure timely parameter reset and avoid unnecessary delay; if a smaller $k_a$ is adopted, it can keep the control parameters at a relatively constant state, which can avoid introducing new disturbances to the system.

The one tenth of the allowable value $\Delta f_p$ of the adaptive control sensitivity factor is set as the boundary of the response sensitivity range, and the adaptive control sensitivity factor can be obtained as follows:

$$k_a = \frac{1}{2\pi \times 0.1 \Delta f_p}.$$

The selection of the upper and lower limits of the adaptive inertia means: the virtual inertia H is a parameter that is adjusted in real time along with $\omega$, and there is an regulation range in the change process, wherein $H_h$ is the upper limit of the value range of H, $H_0$ is the lower limit of the value range of the virtual inertia H. In this invention, the upper limit $H_h$ and the lower limit $H_0$ of the adaptive inertia H can be calculated according to the capacitive energy storage of IIDG or the battery energy storage configuration constraint.

Technical Effect

Compared with the prior art, this invention, based on the three-layer control strategy of VSG, adaptively adjusts the virtual inertia according to the frequency fluctuation range after disturbance and balances the frequency dynamic regulation capability and operational stability of IIDG when disturbed by external systems.

DETAILED DESCRIPTION OF THE PREFERRED EMBODIMENTS

Figure 1:
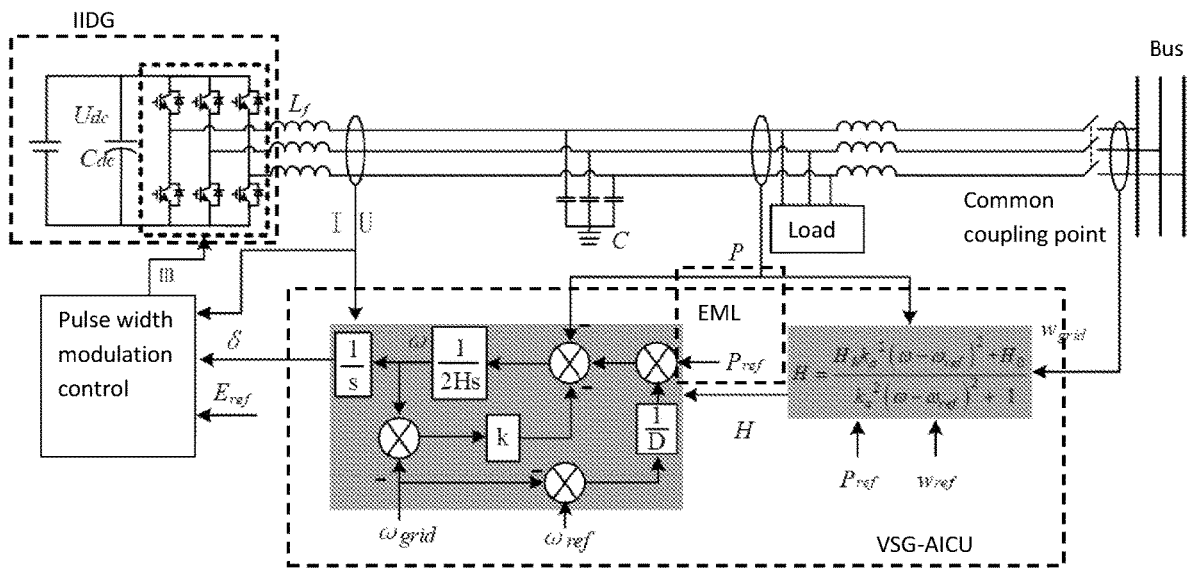
FIG. 1 is a topological structure diagram of IIDG control based on VSG.

As shown in FIG. 1, the embodiment relates to a VSG-based IIDG control system, including: a VSG active-frequency (P-f) adaptive inertia control unit used for active and frequency regulation and a pulse width modulation control unit used for generating on-off signals for the electronic power switch of the inverter, wherein, the active-frequency adaptive inertia control unit simulates the swing equation of the synchronous generator, and gives the three-phase voltage phase δ of IIDG by introducing inertia characteristics and based on the reference value $P_{ref}$ of active power with the adaptive inertia control method. The pulse width modulation control unit gives the three-phase modulation ratio m according to the reference value E of three-phase voltage range and the three-phase voltage phase δ combing the real-time sampled voltage and current output by IIDG.

In FIG. 1, the PWM signal driven by the drive circuit controls the on-off of the switching tube in the inverter bridge, and the voltage output by its bridge arm simulates the internal potential of the synchronous generator. $L_f$ and C are the inductance and capacitance of the filter respectively. After filtered by LC, the output voltage of the inverter simulates the terminal voltage of the synchronous generator. Through the on-off of the common coupling point, IIDG can switch between grid-connected and off-grid operation modes.

Figure 2:
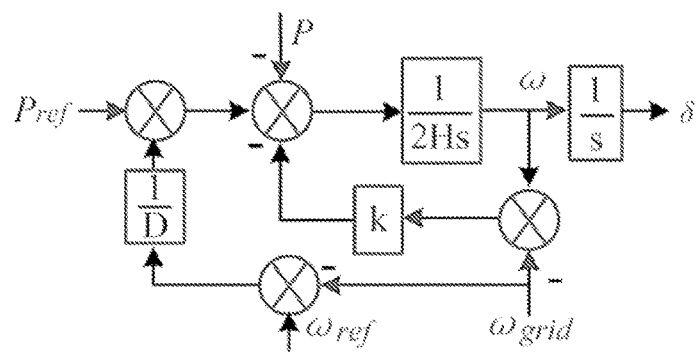
FIG. 2 is a schematic diagram of a VSG active-frequency adaptive inertia control unit according to an embodiment.

As shown in FIG. 2, the pulse width modulation control unit performs the function of frequency modulation, The three-phase voltage phase δ is calculated by receiving $P_{ref}$ and $\omega_{ref}$ output by the energy management layer and measuring P, ω and $\omega_{grid}$ of the actual active power output. The specific process is as follows:

$$2H\frac{d\omega}{dt} = P_{ref} - P - k(\omega - \omega_{grid}) + \frac{1}{D}(\omega_{ref} - \omega_{grid}),$$

wherein, H is adaptive virtual inertia, P is the active power output by the inverter port under VSG control, k is the damping factor, ω is the output radian frequency of IIDG, $\omega_{grid}$ is the common bus radian frequency and D is the active droop coefficient.

When IIDG operates in the grid-connected mode, the frequency control tracks the frequency of external grid by relying on damping term $k(\omega-\omega_{grid})$ and synchronizes with it; when IIDG operates in the off-grid mode, the frequency control adopts active-frequency droop control to simulate the primary frequency modulation of electrical power system, to provide frequency support for IIDG system.

The embodiment relates to a method of adaptive inertia control of the system above, which is realized through an adaptive virtual inertia and IIDG output frequency model, and the specific process is as follows:

$$H = \frac{H_h k_a^2 (\omega - \omega_{ref})^2 + H_0}{k_a^2 (\omega - \omega_{ref})^2 + 1}$$

wherein, $k_a$ the adaptive control sensitivity factor, $H_0$ is IIDG's rated virtual inertia, that is, when $\omega=\omega_{ref}$, the virtual inertia H value is $H=H_0$, when $|\omega-\omega_{ref}|\to\infty$, the virtual inertia H is $H=H_h$. Because the larger the frequency deviation is, the larger the virtual inertia used to restore stability will be, $H_h$ is larger than $H_0$ in this invention, but it is also the upper limit of the variation range of the virtual inertia.

Figure 3:
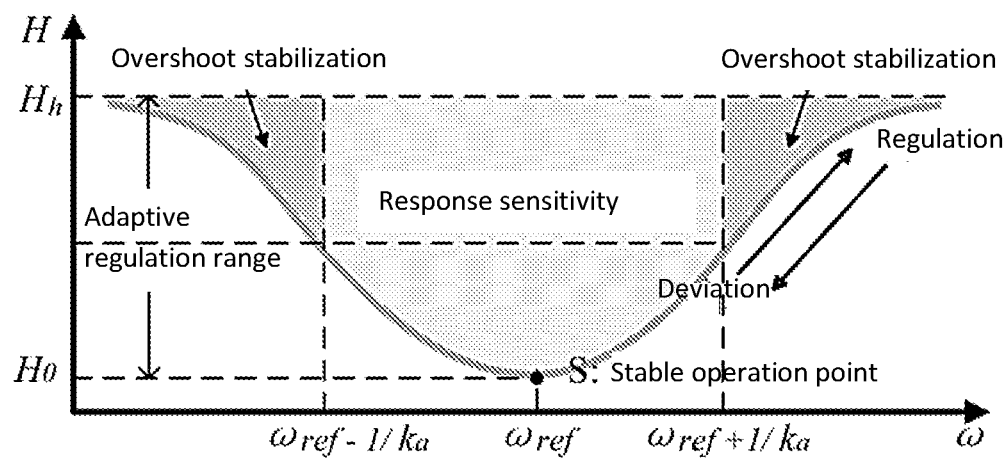
FIG. 3 is a schematic diagram showing the relationship curve between the adaptive virtual inertia constant H and the output radian frequency $\omega$ of IIDG.

The relation curve between the adaptive virtual inertia H and ω as shown in FIG. 3. The dark area in the figure is the response sensitive area, and this range includes the stable operation point S, where the IIDG output radian frequency is $\omega_{ref}$, and the virtual inertia constant H of the control system is $H_0$. The virtual inertia constant near the stable operating point S is small, the absolute value of the system characteristic root is large, and the dynamic stability margin is large. Meanwhile, the slope factor in a small range near the stable operating point is small, and the inertia constant changes little with the frequency fluctuation, which can ensure that the control parameters remain basically unchanged when operating near the stable operating point. In the whole response sensitive range, the virtual inertia constant is small, which enables the control system to respond quickly, reduce the adjusting time, and return to the rated operation state as soon as possible when there is external disturbance.

When the IIDG system is disturbed, its operating state will deviate from the stable operating point, and the control system will enter the overshoot stabilization range. The inertia constants in this area are large, which greatly reduces the influence of external frequency fluctuation on IIDG's own frequency output, so IIDG's output frequency will remain flat without large fluctuation. Under extreme conditions, when the frequency deviation is infinite, the virtual inertia H is $H_h$, so $H_h$ is the upper limit of the whole adjustment range of the whole adaptive virtual inertia constant. When the IIDG output frequency has no deviation, the virtual inertia H is $H_0$, which is the lower limit of the adaptive virtual inertia constant regulation. The value of the virtual inertia constant H is always greater than zero during the regulating process with the change of IIDG output frequency ω, and the control system runs above the asymptote. This makes the control system always have positive damping, and the characteristic root is always located on the left side of the imaginary axis, ensuring the stability of the system is not damaged during the regulating process.

The relationship between virtual inertia H and IIDG output frequency ω shows that, when the frequency deviation reaches $1/k_a$, H will be $(H_0+H_h)/2$, that is the median value of adaptive control area. Therefore, $\omega=\omega_{ref}\pm1/k_a$ becomes the boundary between the two ranges in FIG. 3, the adaptive control sensitivity factor $k_a$ can be used to regulate the relative sizes of the response sensitivity range and the overshoot stabilization range, and this parameter represents the degree of adaptive control sensitivity.

Figure 4:
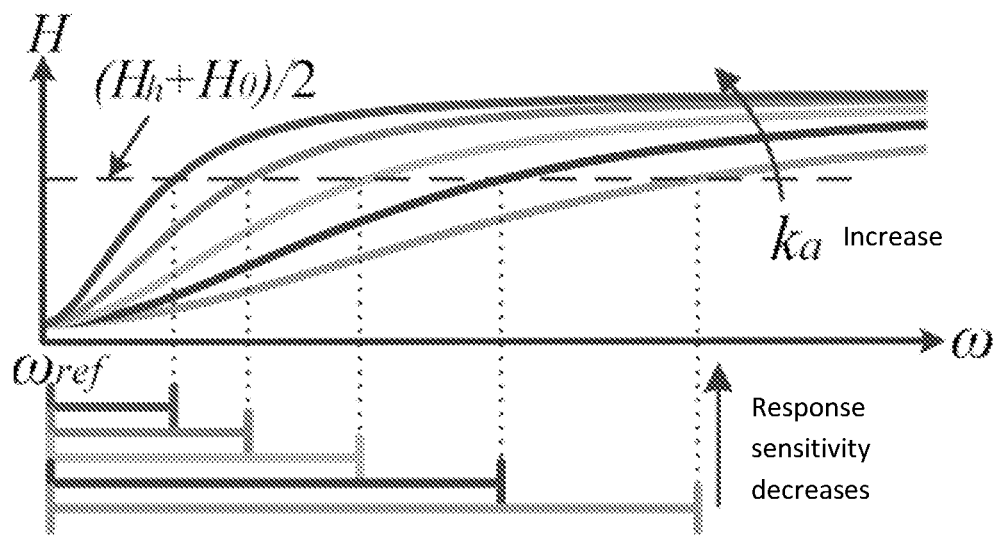
FIG. 4 is a schematic diagram showing the change trend of response sensitivity range under different sensitivity factors.

FIG. 4 shows the change trend of response sensitivity range under different sensitivity factors; With the increase of $k_a$, the response sensitive range becomes smaller and the regulation scale decreases continuously. However, with the increase of $k_a$, the slope factor of the curve at the same frequency deviation increases, which means that the control system is more sensitive and a smaller state change can cause adjustment of parameters. That is to say, when a larger $k_a$ is adopted, it can increase response speed, ensure timely parameter reset and avoid unnecessary delay; if a smaller $k_a$ is adopted, it can keep the control parameters at a relatively constant state, which can avoid introducing new disturbances to the system. In order to make IIDG output stable in actual operation, the value of adaptive control sensitivity factor $k_a$ should be reasonably selected according to grid standards.

In this embodiment, according to the requirement of frequency deviation of quality of electric energy, the one tenth of the allowable value $\Delta f_p$ of the deviation is set as the boundary of the response sensitivity range, and the adaptive control sensitivity factor can be obtained as:

$$k_a = \frac{1}{2\pi \times 0.1 \Delta f_p}.$$

At the stable operation point S of the system, the IIDG output radian frequency $\omega = \omega_{ref}$, similar to the inertia constant in the synchronous generator, satisfies $$2H = \frac{J\omega^2}{S_n},$$

wherein: J is the rotational inertia of the synchronous generator and $S_n$ is the rated capacity of the system.

Because the magnitude of inertia configuration is constrained by energy storage, the energy storage of the system should be equal to the kinetic energy of the system, that is $$\frac{J\omega^2}{2} = \begin{cases} \frac{C_s U_s^2}{2} & \text{Energy storage capacitor} \\ T_b U_b \end{cases},$$

wherein, $C_s$ and $U_s$ are the rated capacity and rated voltage of the storage battery respectively, while $T_b$ and $U_b$ are the rated capacity and rated voltage of storage battery respectively; considering $H_h$ is the corresponding inertia constant when the frequency deviation is infinite under extreme conditions, when IIDG operates stably, the magnitude of inertia configuration only needs to consider the constraint of distributed power energy storage. At this time, the capacity of distributed power should be equal to the kinetic energy of the system. Therefore, the virtual inertia constant the control algorithm when IIDG operates at the power frequency is $$H = H_0 = \begin{cases} \frac{C_s U}{2 S_{n,D}} & \text{Energy storage capacitor} \\ \frac{T_b U_b}{S_{n,D}} & \text{蓄电池} \end{cases}$$

wherein, $S_{n,D}$ is the rated capacity of the distributed power source.

Figure 5:
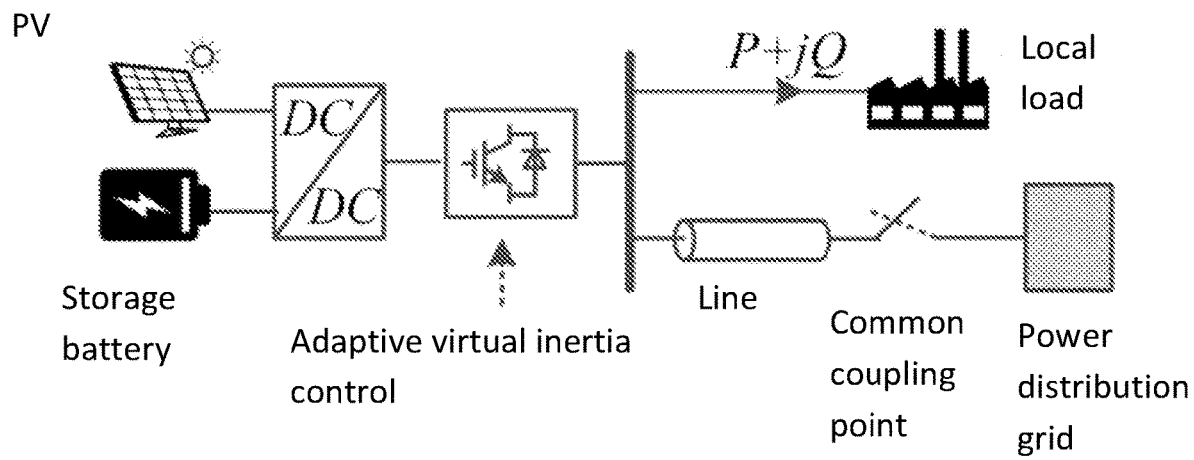
FIG. 5 is a topological structure diagram of optical storage system.

In this embodiment, a photovoltaic-energy storage combined power generation system built in PSCAD/EMTDC according to the topological structure of the optical storage system shown in FIG. 5 is used for simulation verification, and the simulation parameters are shown in table 1.

TABLE 1

| Simulation Parameters | |
|---|---|
| Parameters: | Value |
| DC voltage/kV | 1 |
| DC capacitance/μF | 100 |
| Filter inductance/mH | 1 |
| Filter capacitance/μF | 400 |
| AC phase voltage rms/V | 220 |
| Reference power value | 300 kW + j 100 kVar |
| Line resistance | 0.2Ω |
| Line inductance | 1 mH |

Figure 6A:
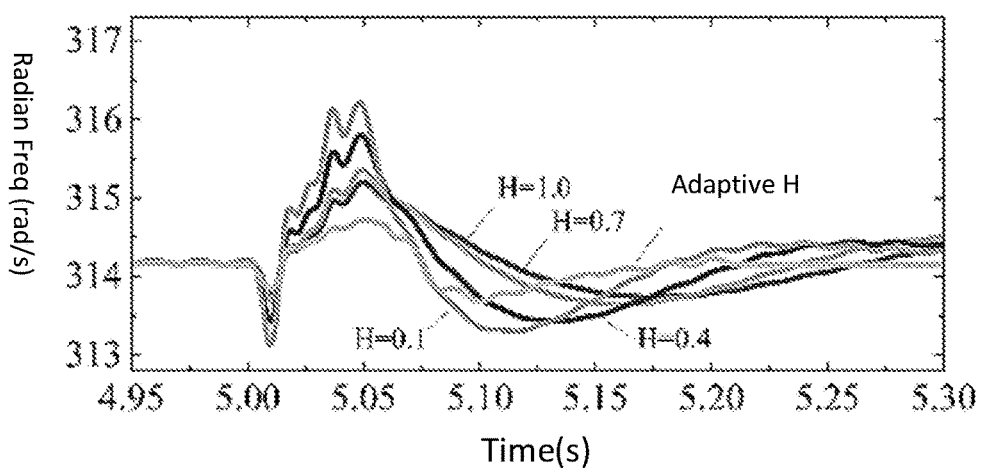
FIG. 6a is a schematic diagram of simulation results of the fluctuation of a superior power grid according to an embodiment (IIDG output radian frequency)
Figure 6B:
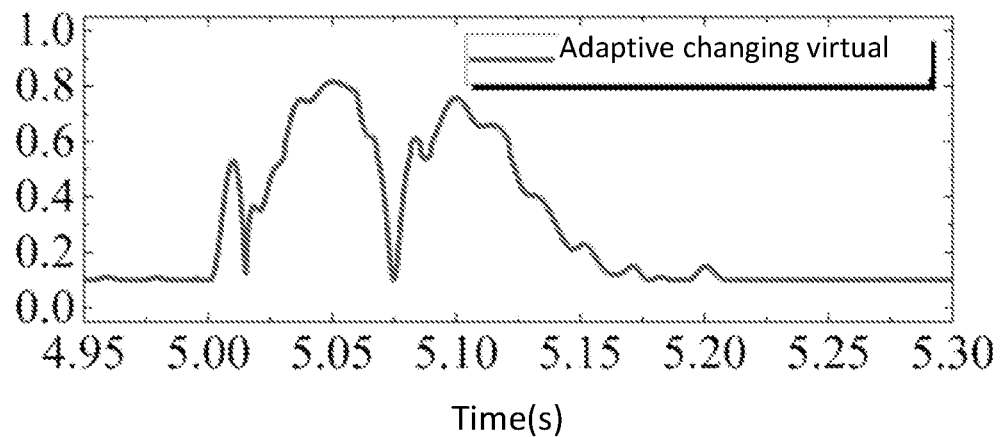
FIG. 6b is a schematic diagram of simulation results of the fluctuation of a superior power grid according to an embodiment (adaptive changing virtual inertia value)

In order to observe the response of IIDG under the control strategy when the upper distribution network system fluctuates, when the system is connected to the grid for 5 seconds, the fluctuation of the upper distribution network system causes the frequency oscillation of the common bus line, the fluctuation is eliminated after two power frequency cycles. FIG. 6(a) shows the changes of IIDG's output frequency under fixed virtual inertia constant and adaptive inertia control, while FIG. 6(b) shows the virtual inertia values corresponding to adaptive changes.

As can be seen from the figure, the IIDG's output frequency is affected and shifted after the oscillation occurs, and finally the oscillation tends to be stable under the action of inertia and the original operation state recovers. Table 2 is the comparison of IIDG output responses under fixed virtual inertia constant and adaptive inertia control, wherein the regulation time is the time required by the response to recover within ±0.1% of the steady state value. It can be seen that, compared with using the fixed virtual inertia constant, on the one hand, the frequency overshoot under adaptive control is smaller and the system's output is more smooth; meanwhile, the disturbance process is extremely fast under the adaptive control, the whole oscillation is compressed, and the system can be recovered quickly. The response characteristic not only has advantage when compared with the maximum and minimum fixed virtual inertia, but also shows great advantages when compared with other values in the virtual inertia regulation range.

TABLE 2

| Comparison of IIDG's output responses in fluctuation of superior power grid | | | |
|---|---|---|---|
| Control method | Virtual inertia H | Overshoot (%) | Regulating time (s) |
| Fixed virtual inertia control | H = 1.0 | 0.36 | 0.199 |
| Fixed virtual inertia control | H = 0.7 | 0.39 | 0.191 |
| Fixed virtual inertia control | H = 0.4 | 0.54 | 0.183 |
| Fixed virtual inertia control | H = 0.1 | 0.68 | 0.172 |
| Adaptive virtual inertia control | $H = \frac{H_h k_a^2 (\omega - \omega_{ref})^2 + H_0}{k_a^2 (\omega - \omega_{ref})^2 + 1}$ | 0.17 | 0.126 |

Figure 7A:
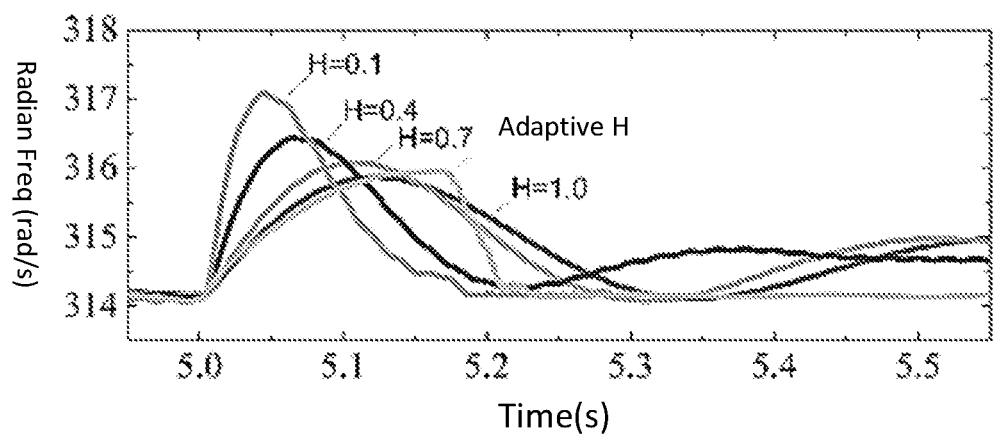
FIG. 7a is a schematic diagram of simulation results when transferring from grid-connected operation to off-grid operation (IIDG output radian frequency)
Figure 7B:
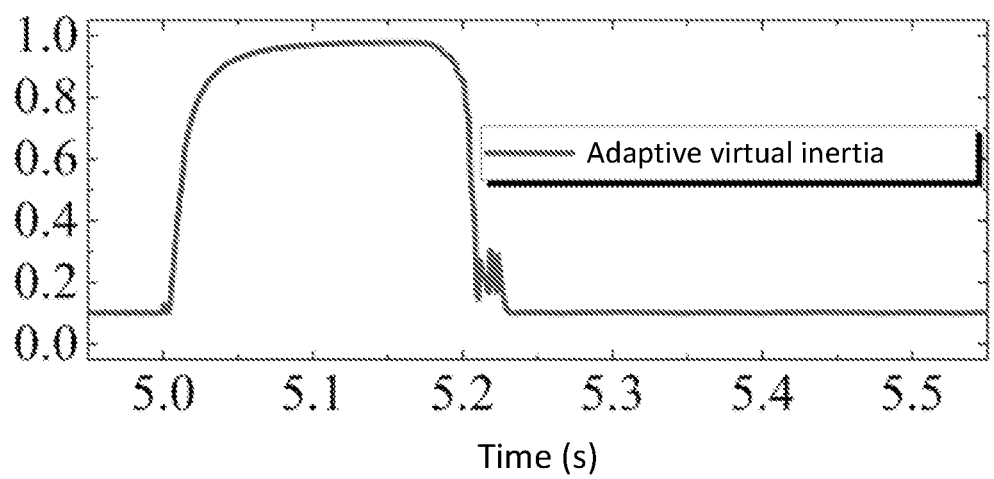
FIG. 7b is a schematic diagram of simulation results when transferring from grid-connected operation to off-grid operation (adaptive changing virtual inertia value).
Figure 8:
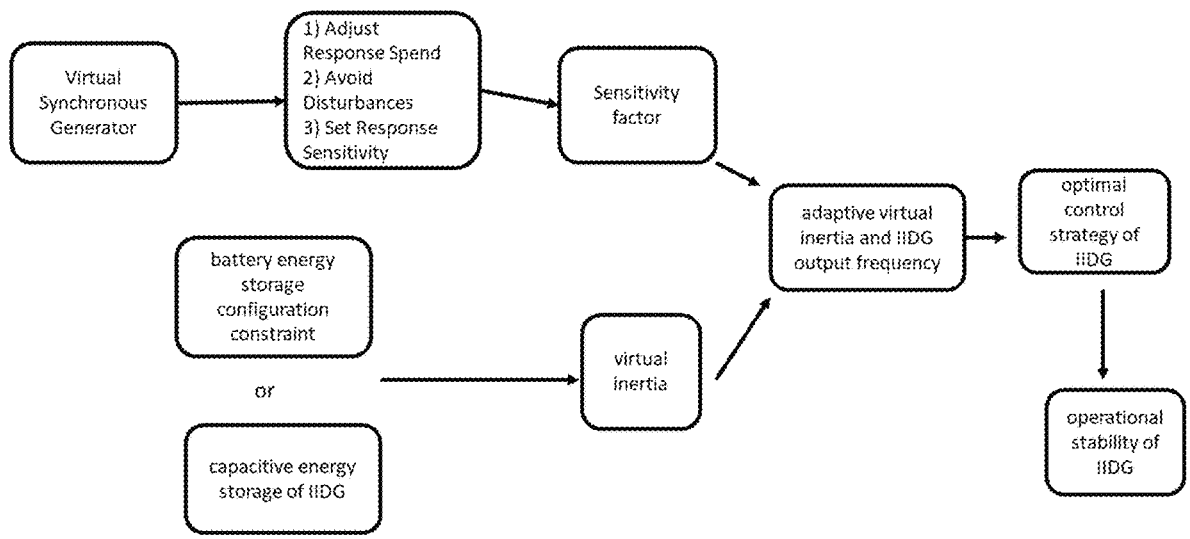
FIG. 8 is a flowchart for controlling an adaptive inertial of IIDG.

In order to observe the stable operation capability of IIDG system from time to time when the frequency of common bus suddenly changes, switch the system to off-grid operation mode after it has operated for 5 s in the mode of being connected to the grid. FIG. 7 is the simulation result.

As shown in FIG. 7, when IIDG is switched to off-grid operation mode after 5 s, due to lack of frequency support from the power distribution network, the output radian frequency deviates but finally returns to a stable operation state under the control of the control system. Table 3 is the comparison of IIDG's output responses under fixed virtual inertia constant and adaptive inertia control after the operation mode is switched. In terms of overshoot response, it can be seen that the frequency overshoot under adaptive control is smaller than that under most fixed virtual inertia constants, only slightly larger than that when H=1.0, but they are quite close. Meanwhile, in terms of response speed, the disturbance process is extremely fast under adaptive control, and its regulating time is close to H=0.1, which represents the fastest response speed of the fixed virtual inertia constants. Therefore, judging from the overall response speed and overshoot, the adaptive control has obvious effectiveness and better control performance.

TABLE 3

Comparison of IIDG's output responses when transferred from grid-connected operation to off-grid operation

| Control method | Virtual inertia H | Overshoot (%) | Regulating time (s) |
|---|---|---|---|
| Fixed virtual inertia control | H = 1.0 | 0.56 | 0.444 |
| Fixed virtual inertia control | H = 0.7 | 0.61 | 0.386 |
| Fixed virtual inertia control | H = 0.4 | 0.74 | 0.271 |
| Fixed virtual inertia control | H = 0.1 | 0.97 | 0.176 |
| Adaptive virtual inertia control | $H = \dfrac{H_h k_a^2 (\omega - \omega_{ref})^2 + H_0}{k_a^2 (\omega - \omega_{ref})^2 + 1}$ | 0.57 | 0.193 |

To sum up, the adaptive inertia control strategy can take account of the output stability and dynamic response speed, effectively improve the system operation performance and strengthen the control effect.

The specific embodiment described above can be adjusted partially by technicians in the field in different ways without violating the principle and purpose of the invention. The scope of protection of the invention is determined by the claims and is not limited by the above-mentioned specific embodiment. All embodiment plans within the scope are bound by the invention.

What is claimed is:

1. A method for controlling an adaptive inertia of IIDG (Inverter-Inter-faced Distributed Generator) based on VSG (Virtual Synchronous Generator), comprising establishing a model of adaptive virtual inertia and IIDG output frequency, and selecting a sensitivity factor from a model based on dynamic response characteristics of the VSG, then, selecting upper and lower limits of an adaptive inertia from a model based on energy storage configuration constraints, and obtaining an optimal control strategy of IIDG;

said model of adaptive virtual inertia and IIDG output frequency is specifically described as follows:

$$H = \frac{H_h k_a^2 (\omega - \omega_{ref})^2 + H_0}{k_a^2 (\omega - \omega_{ref})^2 + 1},$$

wherein, $k_a$ is the sensitivity factor, $H_0$ is IIDG's rated virtual inertia; when $\omega = \omega_{ref}$, the virtual inertia $H = H_0$; when $|\omega - \omega_{ref}| \to \infty$, the virtual inertia H is $H = H_h$.

2. The method according to claim 1, wherein for the sensitivity factor: increasing response speed when a larger $k_a$ is adopted that ensures to reset control parameters and to avoid delay; keeping the control parameters at a constant state if a smaller $k_a$ is adopted which avoids disturbances.

3. The method according to claim 1, wherein one tenth of allowable value $\Delta f_p$ of the sensitivity factor is set as a boundary of a response sensitivity range, and the sensitivity factor is $$k_a = \frac{1}{2\pi \times 0.1 \Delta f_p}.$$

4. The method according to claim 1, wherein for the upper and lower limits of the adaptive inertia: the virtual inertia H is a parameter that is adjusted in real time along with ω, and there is an regulation range in the change process, wherein $H_h$ is an upper limit of value range of H, $H_0$ is a lower limit of the value range of the virtual inertia H; the upper limit $H_h$ and the lower limit $H_0$ of H is created according to capacitive energy storage of IIDG or battery energy storage configuration constraint.

5. A system for implementing the method as described in claim 1, comprising a VSG active-frequency (P-f) adaptive inertia control unit used for active and frequency regulation and a pulse width modulation control unit used for generating on-off signals for electronic power switch of an inverter, wherein, the active-frequency adaptive inertia control unit simulates swing equation of a synchronous generator and gives three-phase voltage phase δ of IIDG by introducing inertia characteristics and based on reference value $P_{ref}$ of active power with the adaptive inertia control method; the pulse width modulation control unit gives a three-phase modulation ratio m according to reference value E of three-phase voltage range and three-phase voltage phase δ combing real-time sampled voltage and current output by IIDG.

6. The system according to claim 5, wherein the three-phase voltage phase δ is calculated by receiving $P_{ref}$ and $\omega_{ref}$ output by the energy management layer and measuring P, ω and $\omega_{grid}$ of an actual active power output; δ

$$2H \frac{d\omega}{dt} = P_{ref} - P - k(\omega - \omega_{grid}) + \frac{1}{D}(\omega_{ref} - \omega_{grid}),$$

wherein, H is the virtual inertia, P is the active power output by an inverter port under VSG control, k is a damping factor, ω is output radian frequency of IIDG, $\omega_{grid}$ is common bus radian frequency and D is an active droop coefficient.

* * * * *